United States Patent Office 3,366,149
Patented Jan. 30, 1968

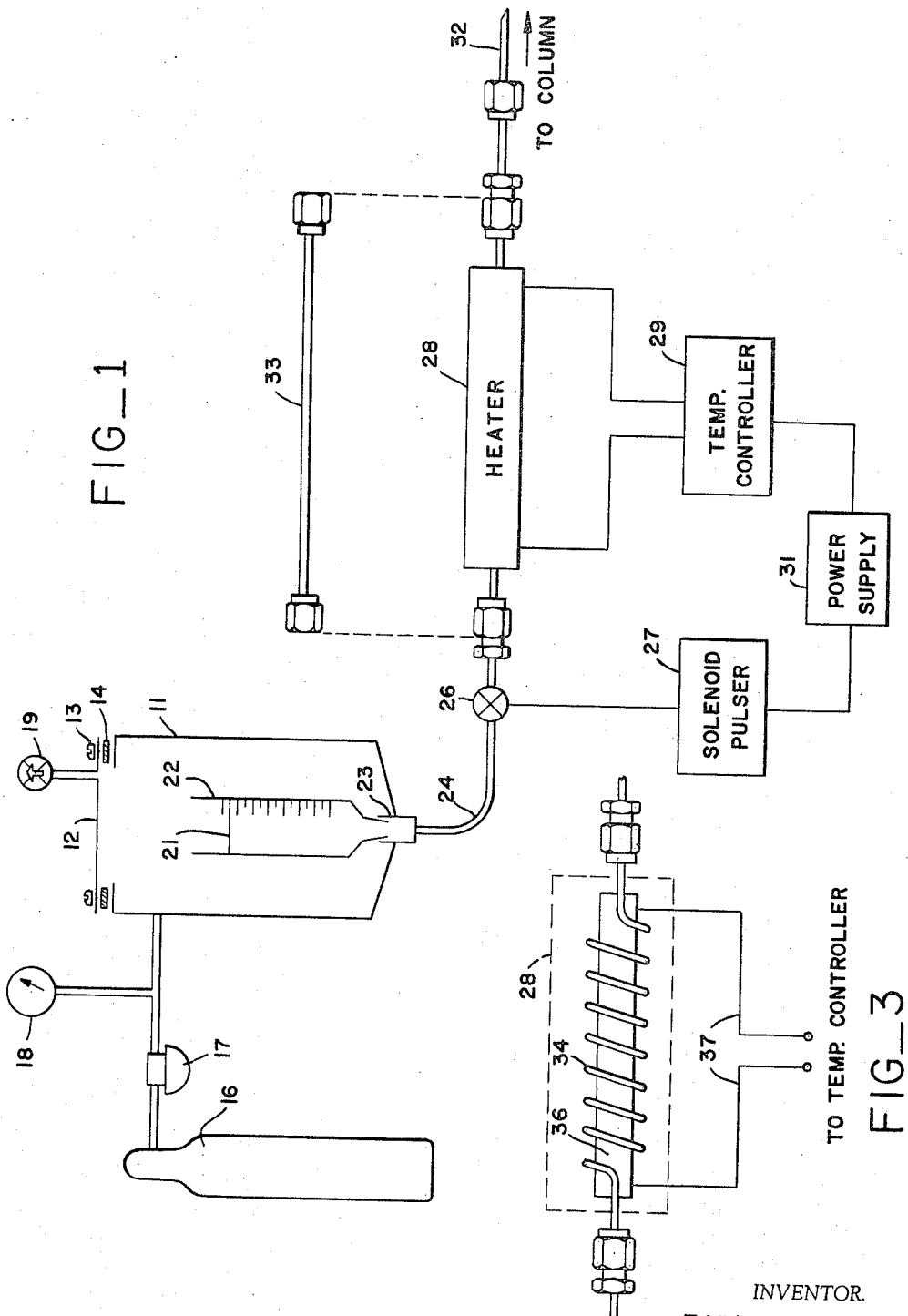

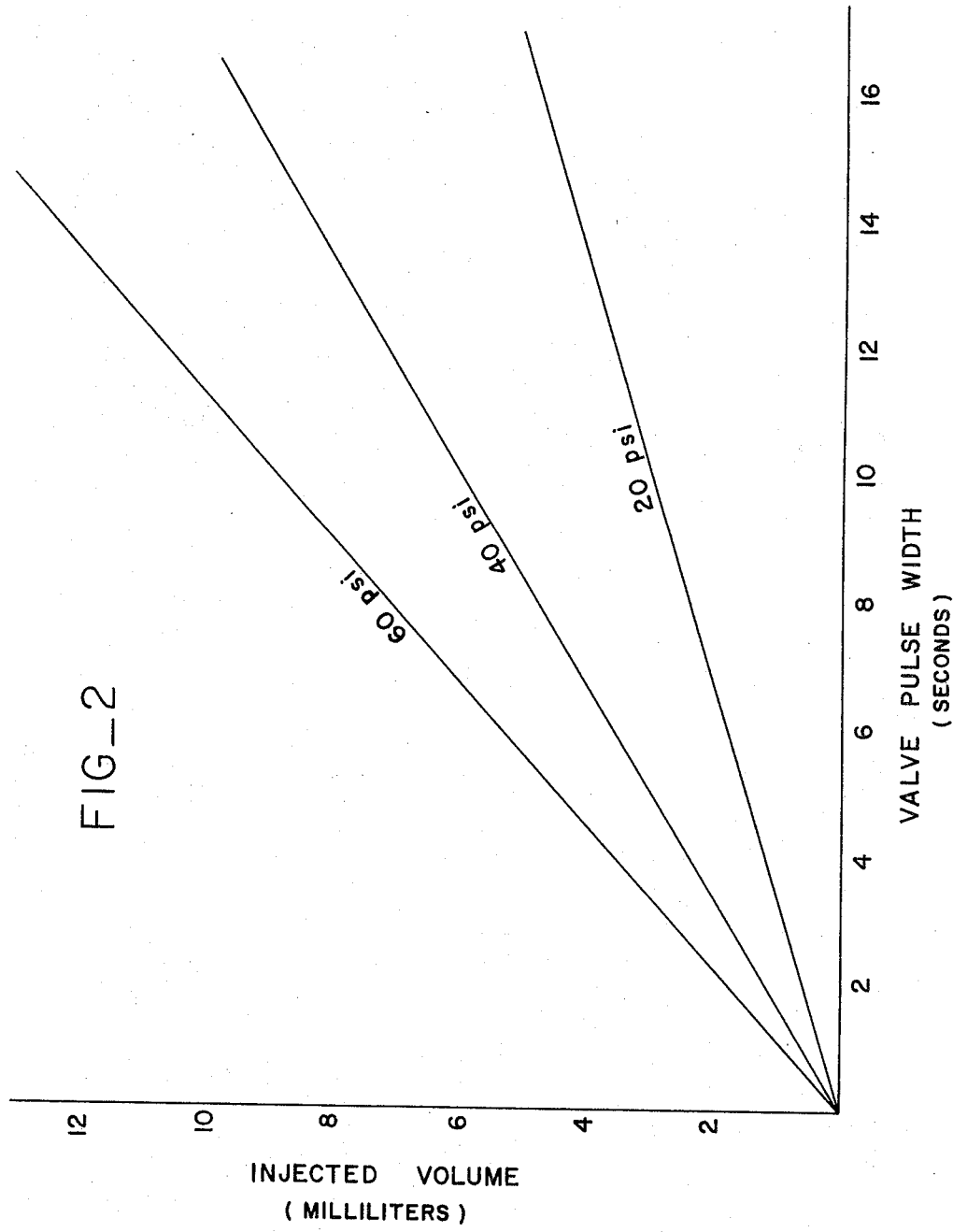

3,366,149
INJECTION SYSTEM FOR GAS
CHROMATOGRAPHY
Earl M. Taft, Lafayette, and John E. Booker, Berkeley, Calif., assignors, by mesne assignments, to Varian Aerograph, a corporation of California
Filed July 15, 1965, Ser. No. 472,288
9 Claims. (Cl. 141—82)

ABSTRACT OF THE DISCLOSURE

A fluid injection system for gas chromatographs in which a fluid reservoir is maintained at constant pressure and a periodically pulsed valve admits reproducible volumes of the fluid into the injection port of the chromatograph. A heater is provided to heat the injected fluid to just below its boiling point, thereby minimizing pressure surges when the heated fluid comes in contact with the chromatographic column.

---

This invention relates to sample injection systems for gas chromatography. In particular, the invention relates to a method and apparatus for repetitively injecting liquid samples into a gas chromatograph.

Gas chromatography was originally developed as a method for separating the components of complex mixtures for purposes of analysis. It has recently been recognized, however, that the unique separative power of the method can also be used to prepare sizable amounts of ultra-pure materials for use as calibration standards, spectrophotometric solvents, etc. This aspect of the method is known as "preparative gas chromatography" to distinguish it from "analytical gas chromatography." One of the differences between the two is the necessity, in preparative work, of injecting large sample volumes in order to recover usable amounts of separated pure materials. Sample volumes in preparative gas chromatography generally range from 1 to 100 milliliters, whereas those used in analytical gas chromatography are much smaller, in the range of 0.001 to 1.0 milliliter.

The injetcion of large sample volumes into a gas chromatograph presents several problems. First, the sample must be injected as rapidly as possible in order to minimize the width of the sample zone on the chromatographic column. This requirement rules out manual injection of large samples because of the excessive time involved. Second, the time interval required for injection must be reproducible so that component retention times are the same from run to run. Once again this precludes manual injection since it is difficult for an operator to depress a syringe pluger in exactly the same time as in a previous injection. A further problem attendant upon the injection of large sample volumes is that rapid vaporization of the sample liquid creates a transient pressure surge which disturbs the pressure equilibrium in the instrument.

The present invention provides a novel method and apparatus for rapidly and reproducibly injecting large sample volumes into a gas chromatograph. Briefly, the invention comprises a reservoir containing the liquid to be injected (the sample liquid), pulsed valve means connected to the outlet of the reservoir for obtaining a well defined "slug" of sample liquid, means for heating the liquid slug, and means for injecting the heated liquid directly onto the column of a gas chromatograph. In the operation of the invention, the liquid reservoir is pressurized to a pressure whose magnitude is determined by the desired flow rate of injection. The valve pulser is set for a pulse frequency and duration corresponding respectively to the desired injection frequency (number of sample injections per unit time) and sample volume per injection.

When the valve is pulsed open, the pressure in the reservoir forces out sample liquid at a constant flow rate until the valve is released into its closed position. The "slug" of sample liquid thus formed is heated by a heater disposed in the flow path, and the heated liquid is injected directly onto the chromatographic column. In order for sample liquid to be injected onto the column, the pressure in the sample reservoir must be greater than the back pressure created by the chromatographic carrier gas flowing through the column. In the description which follows, the terms "plenum pressure," "injection pressure," and "reservoir pressure" will be used interchangeably to mean the difference between the pressure in the sample reservoir and the column back pressure, i.e., the net driving pressure which forces sample liquid through the apparatus.

One of the features of the invention is that the sample reservoir is maintained at a constant positive pressure throughout the injection cycle. Thus, as long as the reservoir valve is open, sample liquid flows out under pressure at a constant rate. Hence, for a given reservoir pressure, the total volume of sample liquid forced out of the reservoir is directly proportional to the "open time" of the reservoir valve. Since the valve timing can be adjusted to any desired value with considerable accuracy, the volume of sample liquid injected is correspondingly accurately determined. This constant pressure feature of the invention is in direct contrast to conventional automatic injection systems wherein the injection pressure, and hence the sample flow rate, is varied within wide limits during the injection cycle. The use of a constant pressure reservoir also eliminates "post-injection dribbling" which is commonly encountered with conventional variable pressure injectors.

A further distinguishing feature of the present invention is that the sample is injected directly onto the chromatographic column as a hot liquid. It has been found that the combined steps of first heating the sample liquid and then injecting the heated liquid directly onto the column markedly reduces the intensity of undesirable pressure surges in the system. This is in contrast to conventional injection devices wherein the liquid sample is first vaporized in a separate vaporizer, thereby creating a sharp pressure surge, and then swept in the vapor state onto the column by the carrier gas. An additional advantage accruing from injecting the sample as a hot liquid directly onto the column is that the surface tension and viscosity of the sample liquid are greatly reduced, thereby facilitating adsorption equilibrium between the sample liquid and the column packing. The lowered sample liquid viscosity also reduces pressure drop both in the column and in the remainder of the flow system.

Other objects, features and advantages of the present invention will be more apparent after referring to the following specification and attached drawings in which:

FIG. 1 is a schematic representation of a preferred embodiment of the injection system adapted for use in gas chromatography;

FIG. 2 is a graphical plot showing the volume of injected sample as a function of valve timing at various indicated reservoir pressures; and FIG. 3 is a detailed view of heater 28 in FIG. 1.

Referring now to FIG. 1, there is shown a plenum chamber 11 which is fitted with a removable cover 12 secured by bolts 13 and pressure gasket 14. The interior of chamber 11 is maintained at a constant preselected pressure by means of a compressed gas source 16, a pressure regulator 17, a pressure gauge 18, and a safety vent valve 19. The liquid to be injected (sample liquid) 21 is contained in a calibrated reservoir 22 which is disposed within chamber 11. Liquid 21 flows out of reservoir 22 through a fluid-tight fitting 23 and thence through a connecting conduit 24 to a solenoid valve 26. The valve is actuated by a solenoid pulser 27 which controls both the time interval the valve is open and the frequency of valve actuation. After flowing through valve 26, the sample liquid passes through a heater 28 whose temperature is set and maintained by a temperature controller 29. A common power supply 31 energizes both controller 29 and solenoid pulser 27. The heated sample liquid is injected directly onto the column of a gas chromatograph (not shown) by means of a hypodermic needle 32 which is inserted into the column packing. A straight-through flow conduit 33 may be substituted in the line for heater 28 as indicated by the dotted lines in the figure. The function of conduit 33 will be explained later.

In the operation of the apparatus shown in FIG. 1, reservoir 22 is filled with a volume of sample liquid 21 sufficient for the anticipated total volume of sample to be injected. Cover 12 is then secured for a pressure-tight seal, and regulator 17 is adjusted until the desired injection pressure is indicated on gauge 18. The injection pressure necessary to yield a given flow rate through the system may be roughly estimated from the following "Poiseuille Law" relation:

(1) $$P = 4 \times 10^{-5}(nLQ/r^4)$$

where:

$P$ = injection pressure in pounds per square inch (p.s.i.)
$n$ = sample liquid viscosity in poise (at heater temp.)
$L$ = total system flow path in centimeters (cm.)
$Q$ = system flow rate in milliliters per second (ml./sec.)
$r$ = average radius of flow system tubing in centimeters This relation is only a rough approximation and is intended to guide the operator in the selection of an initial injection pressure. For accurate determination of the relation between injection flow rate and injection pressure, it is necessary to plot calibration charts such as shown in FIG. 2. These data were obtained using Decalin (decahydronaphthalene) as the sample liquid in an injection apparatus constructed in accordance with FIG. 1. In this particular apparatus the total flow path for the sample liquid consisted of a 10 inch length of stainless steel tubing with an inside diameter of 0.032 inch. As shown by FIG. 2, the sample flow rate is directly proportional to the pressure in chamber 11, and once the apparatus is calibrated for a given sample liquid it is a simple matter to extrapolate the calibration to any desired injection pressure.

The maintenance of a constant pressure within chamber 11 is critical to the accuracy of injected sample volume. Whenever a sample is injected, the lowering of the liquid level in reservoir 22 increases the internal volume V of chamber 11 by an amount $dV$ which is equal to the volume of injected sample. This volume increase causes the pressure P within the chamber to momentarily decrease by an amtount $dP$. Regulator 17 senses the pressure drop and admits sufficient gas from source 16 to restore the chamber pressure to its original selected value. However, the response of regulator 17 is not instantaneous, and there is a finite time interval during which the chamber pressure is not constant. By considering the pressurizing gas as an ideal gas it can easily be shown that the relative pressure decrease $dP/P$ is just equal to the relative volume increase $dV/V$, i.e., $dP/P = dV/V$. In the present invention, this relation is used to advantage by making V much larger than $dV$ so as to minimize $dP/P$. For example, in one apparatus constructed according to FIG. 1, the internal volume of chamber 11 (V) was 1,000 cubic centimeters, and the largest injected sample volume ($dV$) was 10 cubic centimeters. Thus, the relative volume change ($dV/V$) was 10/1000, or 1%, and the corresponding relative pressure change ($dP/P$) was also 1%. By making the chamber volume ten times larger, i.e., 10,000 cubic centimeters, the pressure drop could have been reduced to only 0.1%.

It can be seen from the above discussion that the injection pressure can be kept constant to within any specified tolerance by adjusting the ratio $dV/V$ to the same tolerance. In physical terms, making the chamber volume much larger than the injection volume permits the chamber to function as a "buffer" or "ballast" volume which effectively damps out small changes in injection pressure.

The great accuracy of injection volume obtainable with the present apparatus makes it suitable for use as a fluid metering device in many applications other than gas chromatography. It is often necessary to meter accurately known volumes of a fluid into a container or fluid stream, e.g., pharmaceutical dilution processes, drug infusion studies, chemical kinetics research, etc. By adjusting the valve timing, injection pressure, and $dV/V$ ratio, the present apparatus will automatically meter fluid volumes of any required size. In many such applications, particularly in pharmaceutical manufacture, the injection fluid may be heat sensitive. In such cases heater 28 can be removed and conduit 33 substituted so as to provide a straight through non-heated flow path.

It can be seen from the foregoing that sample injection under constant pressure is one of the features of the present invention which distinguish it from conventional sample injection systems. A further departure from prior art devices is that the sample is injected as a hot liquid directly onto the chromatographic column. As mentioned previously, the combined steps of heating the sample liquid and direct "on-column" injection greatly minimize undesirable pressure surges in the system. It has been found that even heating the sample liquid just a few degrees above ambient temperature will produce observable reductions of system pressure surges on injection. However, for maximum reduction of pressure surges, it is preferable to heat the sample liquid to just below its boiling point immediately prior to injection onto the chromatographic column. Since chromatographic columns are generally operated at a temperature somewhat below the boiling point of the sample liquid, the step of heating the sample liquid to just below its boiling point serves to "match" the temperature of the sample to that of the column. Consequently, there are no abrupt changes in sample vapor pressure when the heated liquid contacts the column, and system pressure surges are thereby minimized.

For slow flow rates, such as occur with low injection pressures and small sample volumes, virtually any type of heater may be used to heat the sample liquid. This is indicated by the heater block 28 in the schematic drawing of FIG. 1. In particular, an electrical resistance heater of tubular configuration may be slipped over the flow line at a point between valve 26 and injection needle 32. The heater may even be dispensed with entirely when very small sample volumes, on the order of a few microliters, are being injected; the vaporization of such a small liquid volume does not produce a serious pressure surge on contact with the hot chromatographic column. For this purpose heater 28 may be replaced with a straight-through flow conduit 33 as indicated by the dotted lines in FIG. 1.

The demands made on the heater are much greater when rapid flow rates (large sample volumes and high injection pressures) are involved. A high heat output and good heat transfer characteristics are necessary to heat a relatively large sample volume in the short time it takes for the sample to pass through the heater. Specifically, it has been found that heaters wherein radiation is the principal heat transfer mode are most satisfactory in applications involving rapid sample flow rates. An example of such a radiative heater is shown in FIG. 3, wherein a heat exchanger coil 34 is wrapped around a radiative heater element 36. Electrical power to the heater is supplied via leads 37. Element 36 may comprise any of several commercially available infra red radiation sources. In particular, the quartz discharge tubes manufactured by the General Electric Co. have been used satisfactorily over long periods. For most applications, heat exchanger coil 34 may be fabricated from metal tubing, preferably stainless steel. However, where maximum heat input to the sample liquid is required, coil 34 may be constructed from a material that is substantially transparent to infra red radiation, e.g., fused quartz. The heat input to the sample liquid is so great with a transparent coil 34 that care must be taken to maintain the sample flow rate high enough to avoid thermal decomposition of the liquid. For certain limited analytical applications, however, this thermal decomposition effect may be used to advantage. A high-boiling sample liquid may be thermally "cracked" or pyrolyzed to form decomposition products of lower molecular weight which boil at a lower temperature than the original material. These decomposition products will elute from the chromatographic column in a much shorter time than the parent material, and hence will facilitate an analysis which would otherwise have been impractical because of time limitations.

As mentioned previously, the injection pressure and valve "pulse width" are the main variables affecting the volume of sample liquid injected per cycle. The injection volume is, of course, also affected by other variables such as conduit diameters, chromatograph back pressure, liquid viscosity, etc., but these are generally constant for any particular apparatus or sample liquid. The injection pressure may be adjusted to any selected value—higher pressures giving faster flow rates through the system. Although there is no theoretical upper limit to the injection pressure, a range of about 1 to 100 pounds per square inch (p.s.i.) has been found convenient in practice. At pressures substantially exceeding 100 p.s.i., special precautions must be observed to prevent leakage at the various fittings, and care must be exercised in selecting a material for plenum chamber 11 that will withstand the high internal pressure. It is convenient to fabricate the plenum chamber from a tough transparent material, e.g., acrylic plastic or tempered glass, so that the calibrations and fluid level in reservoir 22 are visible from outside chamber 11.

The plenum may be pressurized with almost any gas that is available in compressed form. The only limitation on the pressurizing gas is that it should not react chemically with the sample liquid 21. Thus, for example, if the sample liquid is easily oxidized, compressed air could not be used as the plenum pressurizing gas, and an inert gas such as nitrogen or helium would have to be employed. When the apparatus is used as a sample injector for gas chromatography, it is very convenient to utilize the chromatographic carrier gas simultaneously as the plenum pressurizing gas. Since, generally speaking, only inert gases are used as chromatographic carrier gases, this automatically insures against any chemical reaction with the sample liquid.

In the preferred embodiment of the injector, as shown schematically in FIG. 1, the sample liquid 21 is contained in a separate reservoir 22. An alternative arrangement is to use the plenum chamber itself as the liquid reservoir, this being especially convenient when it is desired to inject very large sample volumes. However, for the volume range most frequently encountered in practice, i.e., 1 to 100 milliliters, a separate calibrated reservoir (as shown) is preferable. In particular, reservoir 22 may comprise the barrel of a hypodermic syringe having a suitable volumetric capacity.

The placement and removal of syringes inside chamber 11 is greatly facilitated by using a "Luer-Lok" (trademark of Becton Dickinson Co.) syringe coupling as fitting 23. One half of the Luer-Lok is permanently mounted in the bottom of chamber 11, and the other half of the coupling is mounted on the syringe. In this manner an empty syringe barrel may easily be uncoupled and removed from the plenum chamber for refilling. If an all-glass system is required, as is the case with certain highly reactive sample liquids, a standard glass taper fitting may be used on the syringe barrel instead of the Luer-Lok.

The performance characteristics of valve 26 are critical to the proper operation of the injection system. For use in gas chromatography, the valve must be capable of rapid opening and closing, have positive shutoff, and must have a very low "dead volume." Solenoid actuated diaphragm valves are particularly suited for use with the present apparatus, and excellent results have been obtained with valves wherein a Teflon (Du Point trademark for polytetrafluoroethylene) diaphragm is used as a "flapper" to connect and disconnect the inlet and outlet ports in the valve body.

Solenoid pulser 27 may comprise any device whose output is an electrical pulse of variable width and frequency. The process control art provides numerous electromechanical and electronic timers suitable for pulsing valve 26, the choice of a particular pulser depending upon the accuracy required in volume and frequency of sample injection. Rotating switch timers, in combination with the diaphragm valve described above, give an injection volume accuracy of 1 to 5% depending on the particular timer used. For maximum accuracy and reproducibility of both injection volume and frequency, it is preferable to use an all-electronic pulser having a short rise time and well defined pulse width. Such a pulser may comprise a bistable multivibrator (flip-flop) preceded by a trigger pulse generator whose output frequency can be varied by the operator. Other combinations of like nature will be apparent to those skilled in the digital switching art.

The invention has been described with particular reference to a sample injection system for use in gas chromatography. However, the same apparatus may be used for other applications wherein it is desired to accurately meter known volumes of a fluid into a fluid stream or a container of some type. Such applications arise in drug infusion studies, pharmaceutical dilution procedures, chemical kinetics research, and diverse other fields. In many of these cases it will not be necessary to heat the sample liquid, and the heater can be replaced by the straight-through conduit 33 as described previously. Further, some of these alternative applications may not demand the accuracy and reproducibility required in gas chromatography. In such instances the solenoid valve and pulser may be replaced with a mechanically or pneumatically actuated valve having less critical design features.

While a preferred embodiment of the invention has been shown and described, this is intended to be merely illustrative, and many modifications may be made therein without departing from the spirit and scope of the invention as set forth in the following claims.

What is claimed is:

1. Apparatus for repetitively metering discrete fluid samples of volume $dV$, comprising in combination,
    (a) reservoir means of internal volume V adapted to contain said fluid, V being much larger than $dV$,
    (b) means for maintaining a constant selected gas pressure P within said reservoir, the maximum relative pressure change $dP/P$ being equal to the ratio $dV/V$, where $dV$ is negligible relative to V,
    (c) pulsed valve means communicating with the interior of said reservoir, said valve means cooperating with said constant pressure means to provide a plurality of discrete volumes of said fluid, and
    (d) pulsing means for actuating said valve means as a preselected function of time.

2. Sample injection apparatus, comprising in combination,
    (a) reservoir means adapted to contain a sample liquid,
    (b) means for maintaining a constant preselected gas pressure within said reservoir,
    (c) pulsed valve means communicating with the interior of said reservoir, said valve means cooperating with said constant pressure means to provide a plurality of discrete volumes of said sample liquid, (d) pulsing means for actuating said valve means as a preselected function of time, (e) means for heating said sample liquid volumes, and (f) means for transferring said heated liquid volumes into a gas chromatograph.

3. Apparatus according to claim 2, wherein said constant pressure means comprises a plenum chamber hermetically surrounding said reservoir, and means for admitting compressed gas under constant pressure to the interior of said plenum chamber.

4. Apparatus according to claim 2, wherein said pulsed valve means comprises a solenoid valve in combination with a pulser supplying an electrical pulse of selectable width and frequency to said solenoid valve.

5. Apparatus according to claim 2, wherein said heating means comprises a coiled conduit spaced in heat exchange relation with a radiative heater element.

6. Apparatus according to claim 5, wherein said coiled conduit is constructed from a material substantially transparent to infrared radiation.

7. Apparatus according to claim 5, wherein said radiative heater element is a quartz discharge tube whose output energy is predominantly in the form of infrared radiation.

8. Apparatus according to claim 1, wherein said liquid transfer means comprises a conduit communicating at one end with the column packing of said gas chromatograph.

9. Apparatus for injecting liquid samples into a gas chromatograph, comprising in combination, (a) an hermetically resealable chamber, (b) a source of gas under constant selectable pressure, (c) a conduit communicating between said gas source and the interior of said chamber, (d) a fluid reservoir disposed within said chamber and adapted to contain a sample liquid to be injected into a gas chromatograph, (e) a fluid-tight coupling communicating between the interior of said reservoir and the exterior of said chamber, (f) a solenoid-actuated diaphragm valve whose inlet port communicates with one end of said fluid-tight coupling, (g) an electrical pulser supplying a pulse of selectable width and frequency to the solenoid of said valve, (h) a source of infrared radiation, (i) a coiled conduit surrounding said infrared source so as to absorb substantially all of the infrared radiation emanating therefrom, one end of said coiled conduit communicating with the outlet port of said solenoid valve, and (j) a hypodermic needle whose pointed end communicates with the column packing of said gas chromatograph, and whose other end communicates with the free end of said coiled conduit.

References Cited

UNITED STATES PATENTS

| | | | |
|---|---|---|---|
| 1,943,059 | 1/1934 | Dana | 141—82 X |
| 3,128,619 | 4/1964 | Lieberman. | |
| 3,169,389 | 2/1965 | Green et al. | 73—23.1 |
| 3,198,001 | 8/1965 | Ferrin | 73—23.1 |
| 3,225,520 | 12/1965 | Burow | 55—67 |

LAVERNE D. GEIGER, *Primary Examiner.*

H. BELL, *Assistant Examiner.*